United States Patent [19]

Beebe

[11] Patent Number: 4,825,658
[45] Date of Patent: May 2, 1989

[54] FUEL NOZZLE WITH CATALYTIC GLOW PLUG

[75] Inventor: Kenneth W. Beebe, Galway, N.Y.

[73] Assignee: General Electric Company, Schenectady, N.Y.

[21] Appl. No.: 131,871

[22] Filed: Dec. 11, 1987

[51] Int. Cl.[4] .............................................. F02C 7/264
[52] U.S. Cl. .................................. 60/748; 60/39.822; 60/39.828; 431/268
[58] Field of Search ...................... 69/39.822, 723, 748, 69/740, 39.821, 39.828, 39.826, 39.827; 431/268

[56] References Cited

U.S. PATENT DOCUMENTS

| | | | |
|---|---|---|---|
| 799,856 | 9/1905 | Lemale | 60/39.822 |
| 2,829,494 | 4/1958 | Christensen | 60/723 |
| 2,970,439 | 2/1961 | Berl | 60/39.822 |
| 4,023,351 | 5/1977 | Beyler et al. | 60/743 |
| 4,215,979 | 8/1980 | Morishita | 60/39.826 |
| 4,483,138 | 11/1984 | Willis | 60/748 |
| 4,505,106 | 3/1985 | Frankenberg et al. | 60/288 |

FOREIGN PATENT DOCUMENTS

| | | | |
|---|---|---|---|
| 108332 | 6/1983 | Japan | 60/723 |
| 14938 | 1/1985 | Japan | 60/723 |
| 612060 | 11/1948 | United Kingdom | 60/39.821 |
| 765175 | 1/1957 | United Kingdom | 60/39.827 |

Primary Examiner—Donald E. Stout
Attorney, Agent, or Firm—Jerome C. Squillaro

[57] ABSTRACT

In a gas turbine power plant fuel and air are mixed and ignited in a combustor to provide motive fluid for driving a gas turbine. A fuel nozzle is used to provide a fuel/air mixture into the combustor. According to the present invention, the fuel nozzle also includes an igniter for igniting the fuel/air mixture under conditions which extend the operating range of the gas turbine plant. Also, the igniter is coated with a gas fuel ignition catalyst in order to minimize the fuel/air mixture strength required for combustion and the air pollutants associated with combustion.

2 Claims, 2 Drawing Sheets

FUEL NOZZLE WITH CATALYTIC GLOW PLUG

BACKGROUND OF THE INVENTION

This invention relates to gas turbine combustors; and, in particular, to fuel nozzles for gas turbine combustors; igniters for igniting a fuel/air mixture; and, catalyst material for the inhibition of NOx formation by promoting complete combustion at reduced flame temperature.

Gas turbine manufacturers are currently involved in research and engineering programs to produce new gas turbines which will operate at high efficiency without producing undesireable air polluting emissions. The primary air polluting emissions usually produced by gas turbines burning conventional fuels are oxides of nitrogen, carbon monoxide and unburned hydrocarbons. A combustion catalyst can be used in the reaction zone of a gas turbine combustion system to promote complete combustion of lean premixed fuel and air which will minimize the level of these air polluting emissions. Combustion catalyst designed and manufactured with current state-of-the-art technology are not capable of operation at gas turbine ignition and low load conditions using natural gas or most conventional turbine fuels due to the relatively low combustor inlet temperature and temperature rise associated with these operating conditions.

One method of obtaining a satisfactory catalytic combustion system for gas turbine operation at ignition and low load operation is to supplement the catalytic reactor with a more conventional diffusion preburner at these conditions. The preburner allows for ignition and flame stabilization prior to the addition of the main fuel. In order to minimize air pollution emissions from this diffusion flame preburner, protect the catalytic reactor and provide operational flexibility for the catalytic combustion system, it is necessary for the diffusion flame preburner to have the capability of igniting and/or operating at extremely low fuel flow/heat release rates and very lean overall fuel/air mixtures. It is the intent of this invention to extend the operating range of a heavy-duty industrial gas turbine diffusion flame combustion system to extremely lean overall fuel/air mixtures and fuel flow/heat release rates so low that blow-out would occur with a conventional combustor. It is also the intent of this invention to achieve combustion system ignition at conditions of fuel flow and overall fuel air mixture strength which are too low/lean to obtain ignition with a conventional heavy-duty industrial gas turbine combustion system and spark igniter.

Standard practice for heavy-duty industrial gas turbine combustion systems is to obtain ignition using an electrical discharge (spark) igniter and to stabilizer the diffusion flame aerodynamically. Once ignition is established, no external energy source (i.e., other than combustion of the primary fuel) is required. Alternative ignition means, such as torch igniters are available, however, glow plugs are not in use since simpler systems will suffice for conventional combustion.

It is an object of this invention to provide a fuel nozzle and ignition system for a gas turbine combustor which is capable of igniting fuel at low fuel flow and very lean overall fuel/air mixtures.

It is a further object of this invention to extend the operating range of a gas turbine combustor with respect to the potential for blow-out by providing a fuel nozzle and ignition system in accordance with the present invention.

It is still another object of this invention to minimize the formation of NOx at low fuel flow/heat release conditions and very lean overall fuel/air mixture.

The novel features believed characteristic of the present invention are set forth in the appended claims. The invention itself, however, together with further objects and advantages thereof may best be understood with reference to the following description and drawings.

SUMMARY OF THE INVENTION

The invention is a fuel nozzle and igniter combination for a gas turbine combustor. The fuel nozzle includes a nozzle body including a fuel inlet connection. A fuel tip assembly is located at the downstream end of the fuel nozzle body for dispersing fuel through metering orifices located in the fuel tip assembly. Ignition means are located in the fuel nozzle body for ignition fuel dispersed from the fuel tip assembly. The ignition means includes a coil which is coated with a catalyst material for promoting ignition/combustion under low fuel/heat release conditions. The invention is especially applicable to gas turbine combustion systems utilizing preburners for establishing ignition and combustion upstream from main fuel distributers and a catalytic reactor.

DETAILED DESCRIPTION OF THE INVENTION

Figure 1:
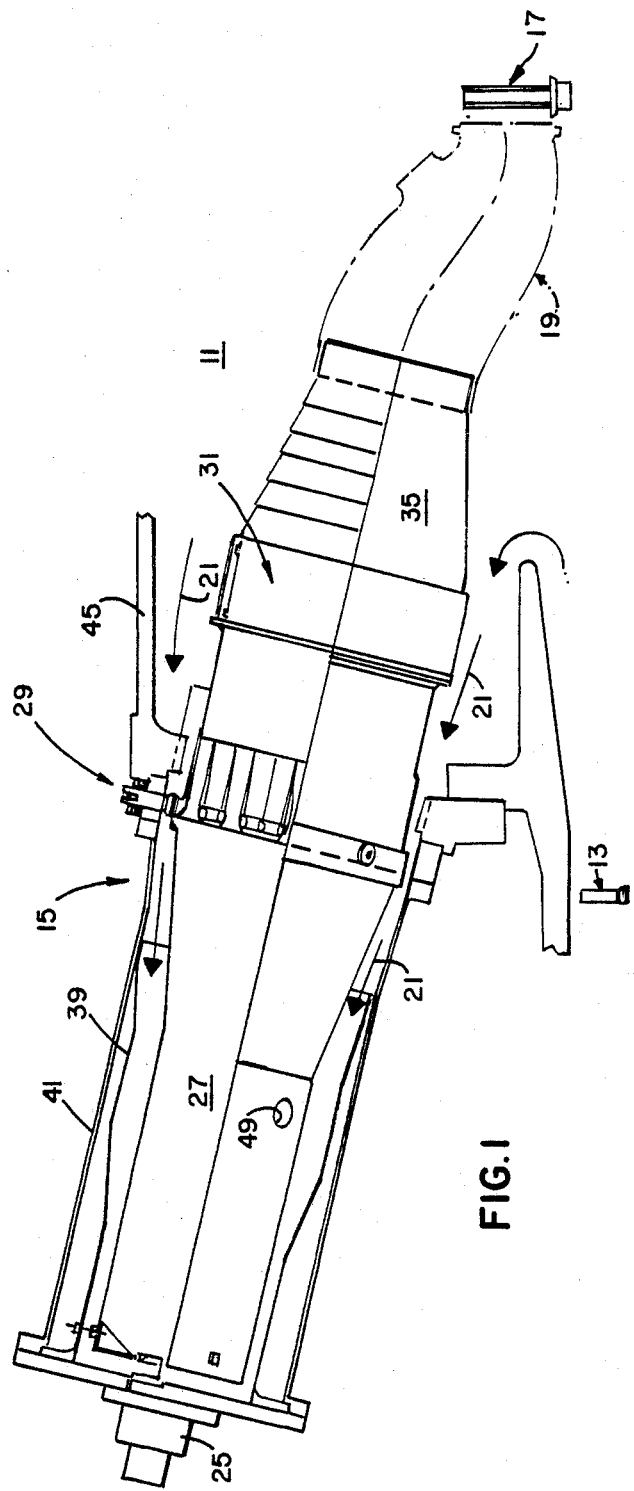
FIG. 1 is a modified cross-section view of a gas turbine combustion system of the type in which the fuel nozzle and igniter of the present invention may be advantageously applied.

With reference to FIG. 1, a gas turbine engine 11 includes a compressor indicated by the small blade 13, a plurality of combustors 15 (only one shown) arranged in an annulus for discharging heated combustor gases into a gas turbine represented by the single blade 17. Each combustor is connected to the turbine by a transition duct 19. As is well known in the art, the compressor provides pressurized air 21 to the combustor 15 for the purposes of cooling and for providing air needed for the combustion process. Fuel is added to the combustor through an upstream nozzle 25. The combustor which is shown with respect to the present invention includes a combustor section which further includes a preburner 27, a main fuel distributor 29, a catalytic reactor 31 and a reactor zone 35. This is one example of an advanced gas turbne combustor although the invention could find use in a combustor without a preburner or main fuel distributor or even without a catalytic reactor. The preburner is partially enveloped in a flow sleeve 39 which channels compressor discharge air 21 around the preburner 21 and to the fuel nozzle 25. According to the prior art, the preburner 27 would also include an igniter (not shown) which would be located downstream from the fuel nozzle and be directed radially inwardly through the a preburner casing 41 which surrounds the flow sleeve 39. Each combustor also includes a combustor wrapper 45 which together with the preburner casing 41 forms an airtight housing around the combustor. The prior art igniter was usually a spark discharge device (spark plug) which had a tip extending into the preburner 27 through a hole formed in the preburner, also not shown.

The mode of operation of the gas turbine power plant is well known. The compressor 13 is initially driven by a motor until the air pressure is sufficient to sustain combustion in the preburner. At an appropriate air pressure, fuel is added to the compressor air which is input into the combustor through the nozzle and combustion air holes 49 in the preburner. Fuel is added through the fuel nozzle 25 whereas ignition of the fuel-/air mixture is caused by the aforementioned igniter (not shown) located downstream from the fuel nozzle. A flame is thereby established in the preburner whereupon fuel is added in the main fuel distributor 29. The burning fuel/air mass is passed through the catalytic reactor 31 and combustion is completed in the reaction zone 35. The combustion products are sent to the turbine 17 through the transition duct 19. The turbine then provides rotational power to drive a load and the compressor which has been declutched from the starter motor.

The foregoing is operationally limited by required fuel flows and operating temperatures necessary to initiate combustion, sustain combustion and optimize operation of the catalytic reactor. For example; during start-up, catalytic reactor operation may be limited until a certain operating temperature is reached. Under certain low fuel flows there may be a blow out of the combustor flame. Also, during catalytic reactor operation, the preburner flame may be intentionally extinguished to minimize NOx formation. Relighting the flame using a prior art ignition system could cause an explosion which might severely damage the catalytic reactor. Thus the present invention is intended to overcome these difficulties and extend the efficient operating range of the gas turbine.

Figure 2:
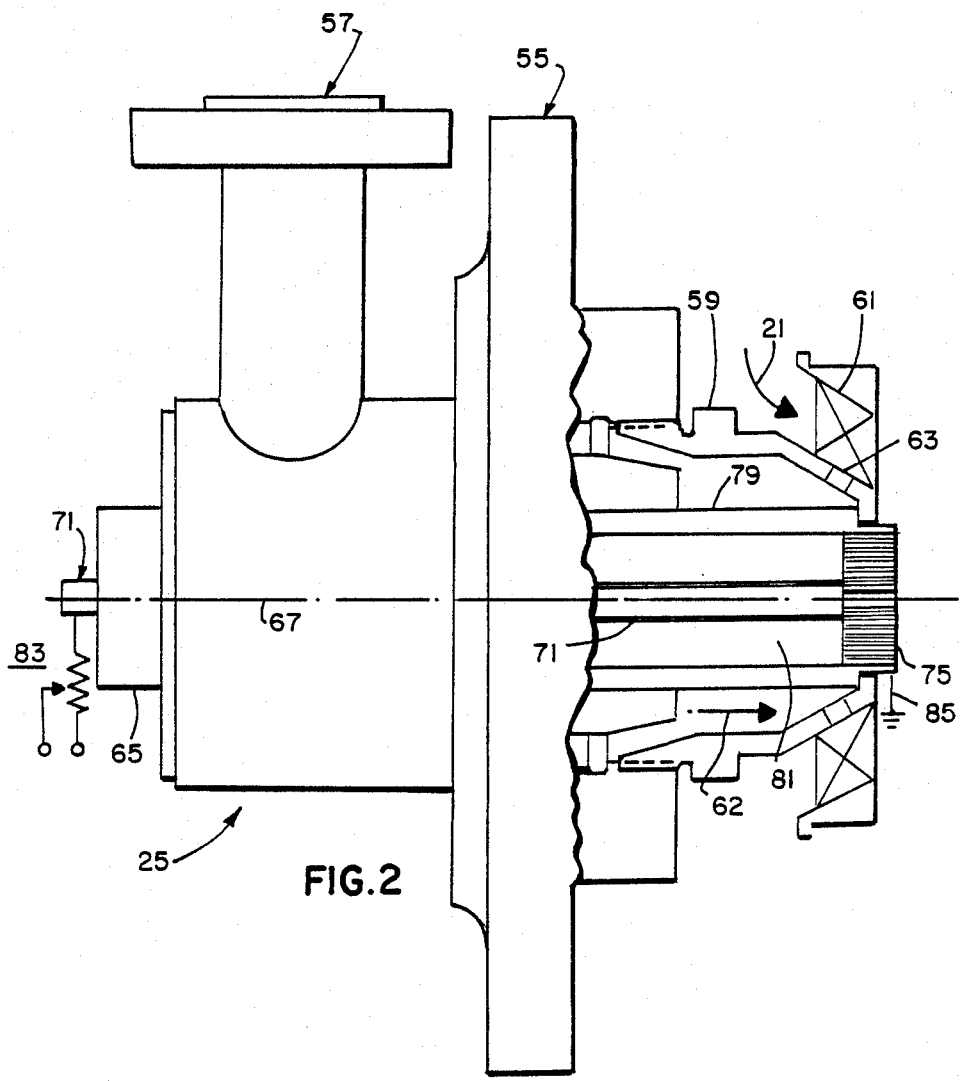
FIG. 2 is a cross-section drawing of a fuel nozzle and igniter in accordance with the present invention.

Referring to FIG. 2, the fuel nozzle 25 is, for example, the type of fuel nozzle which utilizes natural gas as a fuel. The fuel nozzle 25, as shown in FIG. 1, is mounted in the upstream end of the preburner 27 and is pointed downstream into the preburner. The fuel nozzle will operate with any suitable gas turbine fuel which may be, for example, natural gas.

The fuel nozzle includes a generally annular fuel nozzle body 55 which has an axial centerline 67. A fuel inlet connection 57 provides a conduit to admit fuel into the fuel nozzle body. A fuel tip assembly 59 is positioned at the downstream end of the fuel nozzle body and has an axial centerline which is generally coincident with the axial centerline 67 of the fuel nozzle body. A swirler 61 is mounted around the downstream end of the fuel tip assembly and includes a plurality of slots for imparting a circumferential direction to compressor air 21 just prior to being admitted into the preburner. Fuel 62 enters the swirler through a plurality of metering orifices 63 which connect the interior of the fuel nozzle body with the swirler slots 61. In this way fuel and air are input into the preburner 27.

Figure 3:
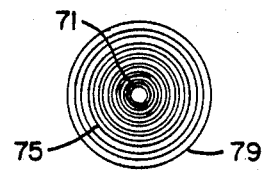
FIG. 3 is a front elevation view of the igniter.

A catalytic glow plug assembly 65 includes an electrode 71 mounted substantially coincident with the centerline axis of the fuel nozzle body and extends forwardly through the nozzle body into the fuel tip assembly. The electrode is connected to a heater coil or igniter 75. The igniter is positioned within a casing 79 which supports the igniter and electrode within the fuel nozzle body and fuel tip assembly. The electrode is surrounded by electrical insulation 81 which insulates the casing 79 from the electrode. There are means for energizing the igniter 75 in the form of an adjustable potentiometer 83 which connects the electrode to a voltage source and a ground connection 85 which is schematically represented as being connected to the casing 79 and igniter 75. FIG. 3 is an elevation view of the coil 75, the electrode 71 and the casing 79.

In accordance with the invention, the coil or igniter 75 could be made from a high temperature electrical resistor material which may be for example Kanthal. Further, the surfaces of the coil are coated with a gas fuel ignition catalyst which may be, for example, Palladium.

The operation of the present invention is as follows. The heater coil or igniter 75 is connected to the central electrode 71 at the forward or downstream end of the fuel nozzle body. When the electrode is connected to an electrical power source 83, electrical current passes through the igniter or coil 75 which is heated due to its electrical resistance. The flow of current may be regulated by varying the applied voltage across the coil to cause the gas fuel ignition catalyst temperature at the surface of the coil to rise above the temperature which will cause auto ignition of the gas fuel/gas mixture in the recirculating flow zone created just downstream of the swirler 61. The effects of the energy input from the electrical power source, and the reduction in activation energy required to initiate combustion due to the gas fuel ignition catalyst, combine to allow combustion to be initiated or sustained in the combustor at a fuel/air mixture which is too lean for combustion to occur without the catalytic glow plug assembly in accordance with the present invention.

While there has been shown what is considered to be the preferred embodiment of the present invention, other modifications may occur to those of skill in the art. It is intended to cover all such modifications which fall within the true spirit and scope of the appended claims.

What is claimed is:

1. A nozzle for delivering and igniting a fuel within a gas turbine combustor comprising:
   a fuel nozzle body including at least one fuel inlet connection at a fuel inlet end of said fuel nozzle body;
   a fuel tip assembly at the discharge end of the fuel nozzle body;
   a swirler cap, including a plurality of swirler blades, disposed in an annulus around the fuel tip assembly;
   fuel discharge holes for discharging fuel from the interior of the fuel tip assembly onto the swirler blades;
   means for admitting a supply of pressurized air to said swirler cap for mixing with said fuel;
   a casing axially centered within the fuel nozzle body and the fuel tip assembly;
   a glow plug igniter positioned within the casing;
   said igniter including a coil of electrically resistive material;
   said coil being centered in said annulus;
   said coil being a base metal;
   said base metal being an electrically resistive material of a type capable of being heated by electrical power flowing therethrough;
   a catalyst material coating said base metal;
   mean of applying electrical power to said coil for heating said coil; and
   said catalyst being of a type capable of reacting with the fuel and air emerging from said swirler cap to produce combustion, whereby fuel discharged from the nozzle may be ignited.

2. The fuel nozzle recited in claim 1 wherein the catalyst is Palladium.

* * * * *